Sept. 21, 1943.  M. A. EDWARDS  2,330,037
GENERATOR CONTROL AND REGULATION
Filed Nov. 28, 1941
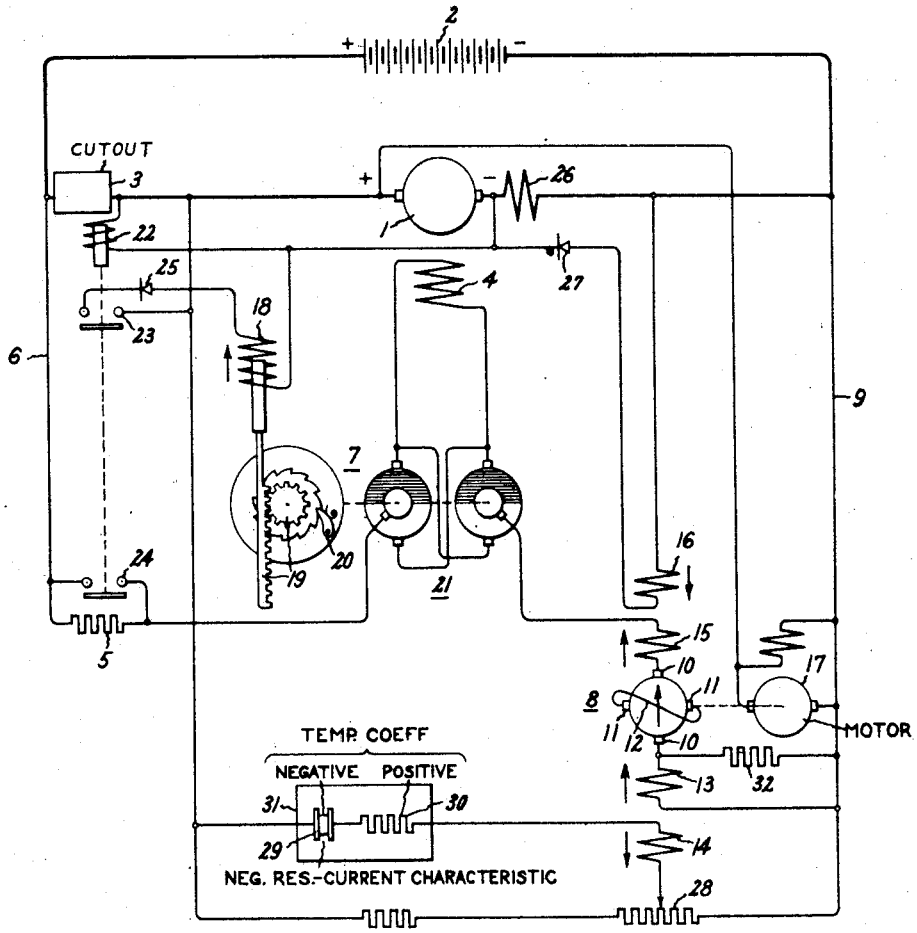
Inventor:
Martin A. Edwards,
by Harry E. Dunham
His Attorney.

Patented Sept. 21, 1943

2,330,037

UNITED STATES PATENT OFFICE 2,330,037

GENERATOR CONTROL AND REGULATION

Martin A. Edwards, Scotia, N. Y., assignor to General Electric Company, a corporation of New York Application November 28, 1941, Serial No. 420,823

6 Claims. (Cl. 171—312)

This invention relates to a combined control and regulating circuit for electric generators and more particularly to an automatic polarity control and voltage regulating circuit for direct-current generators of the axle-driven type.

By a generator of the axle-driven type is meant a generator which is driven in either direction of rotation and at widely variable speeds.

The invention is characterized by a rugged and sensitive voltage regulator circuit which will maintain the generator voltage substantially constant over a speed range of at least 4:1 and which will also provide an automatic current limit for protecting the generator against overloads. The invention is further characterized by the use of an impulse type relay for insuring constant polarity of the generator regardless of its direction of rotation.

An object of the invention is to provide a new and improved automatic control system for variable speed reversible generators.

Another object of the invention is to provide a new and improved automatic voltage regulator system for electric generators.

The invention will be better understood from the following description taken in connection with the accompanying drawing and its scope will be pointed out in the appended claims.

Referring now to the single figure of the accompanying drawing, there is shown therein diagrammatically an embodiment of the invention as applied to a direct current generator 1 for charging a storage battery 2. The generator is driven by any suitable means (not shown) and it may be driven in either direction and over a speed range of at least 4:1. For controlling the connections between the generator and the battery there is provided a conventional line contactor or cutout 3 of any well-known type. The purpose of this device is to interrupt the connection when circuit conditions are such that the battery tends to discharge into the generator and to make the connection when circuit conditions are such that the generator tends to send charging current into the battery. The generator is provided with a main field winding 4 which may be considered as a shunt field winding during normal operation when the line contactor 3 is closed but which is permanently connected across the battery through a high resistance 5 so that a small amount of current will always flow in the field winding. This circuit may be traced from the positive side of the battery through a conductor 6, resistor 5, the contacts of an impulse relay 7 and a regulating generator 8 and then back to the negative side of the main power circuit through a conductor 9. As thus connected the regulating generator constitutes a so-called series exciter.

The generator 8 is of the cross armature reaction excited direct armature reaction compensated type which is characterized by very rapid and large changes in its terminal voltage in response to variations in magnetization of its control field winding or windings. The details of a preferred form of construction of this machine are described and claimed in Patent No. 2,227,992 granted January 7, 1941 on joint application of mine and E. F. W. Alexanderson and assigned to the assignee of the present application. This machine has a pair of main brushes 10 and a pair of quadrature brushes 11 which are interconnected by a low resistance conductor 12 so as to provide an effective short circuit between the brushes 11. For controlling the voltage of machine 8 there is a boosting control field winding 13 and a bucking field winding 14. For compensating for the direct armature reaction of the machine resulting from current flow through the armature between the main brushes 10 there is a compensating winding 15 and for providing current limit control of the main generator 1 there is provided an additional control field winding 16.

Generator 8 is driven by any suitable means, such as by a shunt motor 17 connected across the main generator 1.

The polarity of the main generator is controlled by the impulse relay 7 which is shown by way of example as comprising an operating magnet 18 which by means of a suitable drive, such as a rack and pinion 19 and a ratchet 20, serves to rotate a set of contacts 21 through 180 degrees for each impulse or energization of the winding 18. The contacts 21 are in effect a reversing switch so that every time the operating winding 18 receives an impulse the polarity of the main field winding 4 is reversed.

For controlling the application of main generator voltage to the winding 18 and to the field winding 4 there is provided an auxiliary relay 22 connected across the generator and having a set of contacts 23 for controlling the connection of the winding 18 across the generator 1 and having a set of contacts 24 for short circuiting the resistance 5.

For preventing energization of the winding 18 if the main generator polarity is correct there is provided a unidirectional condutor 25 connected in series with the winding 18. This device may be of any suitable type, such for example as a well-known half-wave copper-oxide rectifier.

The main generator is preferably, although not necessarily, provided with a series commutating field winding 26. As the voltage drop across this winding provides a convenient indication of the main generator current, the current limit control winding 16 is connected across the winding 26. For preventing energization of the current limit control winding 16 at low values of main generator current and at all values of reverse generator current a unidirectional conductor 27 is connected in series with the winding 16.

In order to control the generator 8 in accordance with the voltage of the main generator 1 the bucking field winding 14 is connected across the main generator through a rheostat 28 whereby the voltage level held by the regulating circuit may be readily adjusted.

In order to insure accurate regulation the energization of the bucking winding 14 is made disproportionately responsive to the voltage of the main generator by means of a non-linear impedance 29 connected in series therewith. This impedance is preferably of the ceramic resistance material described and claimed in Patent 1,822,742, granted September 8, 1931 on an application of K. B. McEachron and assigned to the assignee of the present application. It has a negative resistance-current characteristic in the sense that the resistance decreases with increases in current. This characteristic is more accurately defined by the equation $RI^a=C$ where R is its resistance in ohms, I is the current through it in amperes, $a$ is an exponent whose value is determined by the controls used in the manufacture of the material and C is a constant whose value depends upon the physical dimensions of the particular resistor which is being used. This material has a slight negative temperature coefficient of resistance which is ordinarily negligible and not of the same order of magnitude as it's inherent instantaneous negative resistance current characteristic; that is to say, the decrease in resistance resulting from a 100 per cent increase in current which occurs instantaneously is many times greater than the decrease in resistance resulting from the rise in temperature caused by doubling the current. However, for accurate voltage regulation under conditions of widely varying ambient temperature any temperature error caused by the negative temperature coefficient of resistor 29 may be entirely compensated for or neutralized by a resistor 30 connected in series with resistor 29 and having a positive temperature coefficient of the same numerical value as the negative coefficient of the resistor 29. These two resistors are preferably mounted in the same container 31 so as to insure that their temperatures will both be the same.

The operation of the illustrated embodiment of the invention is as follows: Assume that the generator 1 is started from rest in either direction of rotation. By reason of the small energization of the main field winding 4 a relatively low voltage will appear across the terminals of the generator 1. At a predetermined value of this voltage, which predetermined value will be less than the battery voltage and therefore less than the voltage at which the line contactor 3 closes, the auxiliary relay 22 will pick up thereby applying voltage to the operating winding 18 of the impulse relay 7 through the closure of the contacts 23 and increasing the voltage across the main field winding 4 as a result of the short circuiting of the resistor 5 by means of the closing of the contacts 24. If the generator polarity is correct the rectifier 25 will prevent energization of the impulse relay 7. However, if the polarity is incorrect the impulse relay will be energized and its contacts 21 will reverse the polarity of the field winding 4. This, of course, will mean a reversal of current in the field winding 4 and consequently the current will have to pass through zero thereby momentarily dropping out the relay 22. However, the generator will quickly build up voltage again with the correct polarity and the relay 22 will again pick up thereby short circuiting the resistor 5 and strengthening the main field winding 4 so that the voltage of the generator 1 continues to build up. The generator polarity being correct the impulse relay 7 will not be energized. At the proper time the line contactor 3 will close and the current will flow from the generator into the battery.

The regulating generator 8 may either be a buck or a boost generator. Assuming that it is a boosting generator and thus its voltage aids the voltage of the main generator in sending current through the field winding 4 it will be seen that the current in the field winding 4 which passes through the generator 8 and through the boosting field winding 13 will cause the field winding 13 to produce an exciting flux along the axis of the main brushes 10. This will result in voltage being induced between the quadrature brushes 11 which will result in a heavy short circuit current through the conductor 12. This will produce a large so-called cross armature reaction flux which provides the main excitation for the generator 8. Thus, this cross armature reaction flux being along the axis of the quadrature brushes 11 will induce a relatively high voltage between the main brushes 10. Thus, the voltage of the generator 8 will build up rapidly and this in turn will increase the current in the main field winding 4 and thus increase the voltage of the main generator 1.

As the voltage of the main generator 1 increases, the current in the bucking field winding 14 also increases and due to the non-linear characteristic of the resistor 29 this increase in current will be more rapid than, or more than proportional to, the increase in voltage. By a proper adjustment of the rheostat 28 the circuit can be so adjusted that at a predetermined generator voltage the relative strengths of the bucking and boosting windings are such that the circuit becomes stable and the generator voltage 1 is maintained constant at a predetermined value. Any departure from this value will disturb the balance between the ampere-turns of the bucking and boosting windings and therefore the voltage of the generator 8 will rapidly increase or decrease as the case may be so as to provide the necessary change in energization of the field winding 4 in order to return the voltage of generator 1 to normal.

It is usually found desirable to by-pass some of the boosting field winding current through an auxiliary resistor 32 for ease of adjusting.

Upon the occurrence of excessive generator currents the voltage across the commutating field winding 26 will be such that sufficient current can flow in the field winding 16 through the resistance of the rectifier 27 to affect the voltage of the regulating generator 8. Winding 16 has a magnetizing effect which is in the same direction as that of the bucking winding 14 so that as the generator current increases, the voltage of the generator 8 is decreased thereby in turn lowering the main generator voltage and thus limiting the main generator current.

The compensating winding 15 is for the purpose of providing substantially full compensation for the direct armature reaction caused by the main current between the brushes 10 of the generator 8. As the effects of the compensating winding 15 and the boosting winding 13 are in the same direction, these two windings are effectively one winding so that each may equally well be looked upon as different sets of turns of the same winding.

While there has been shown and described a particular embodiment of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In combination, a main dynamo-electric machine, a cross armature reaction excited direct armature reaction compensated direct current generator electrically connected for controlling an electrical operating condition of said machine, a control winding on said generator, and means including a non-linear resistor for energizing said control winding in accordance with the value of said operating condition, said resistor having a characteristic which is defined by $RI^a = C$ where R is in its resistance, I is the current through it, $a$ is an exponent which is determined by its manufacture and C is a constant which is determined by its physical dimensions.

2. In combination, a machine having an electrical operating condition to be regulated, a cross armature reaction excited generator electrically connected for controlling said condition, series connected boosting control and direct armature reaction compensating field turns on said generator, bucking field turns on said generator, and non-linear impedance means responsive to the value of said condition for controlling the energization of said bucking field turns.

3. In combination, a main generator, a field winding therefor, a cross armature reaction excited direct armature reaction compensated dynamo connected in series with said field winding as a buck and boost generator, a plurality of boosting series control field turns on said dynamo, a plurality of bucking control field turns on said dynamo connected to respond to the voltage of said main generator, and negative impedance-current characteristic means connected in series with said bucking turns.

4. The combination as set forth in claim 3 together with a plurality of additional bucking control field turns on said dynamo, and means responsive to main generator current in excess of a predetermined value for energizing said additional turns.

5. In combination, a direct current generator whose armature is driven in either direction, a field winding for said generator, a constant polarity source of current for energizing said field winding, a polarity reversing switch for connecting said field winding to said source, and means responsive to reverse polarity of said generator for operating said switch so as to reverse the polarity of said field winding.

6. The combination as set forth in claim 5 in which said means includes an electroresponsive device effectively connected across said generator through a unidirectional conducting device.

MARTIN A. EDWARDS.